United States Patent [19]

Sodder

[11] Patent Number: 5,949,784
[45] Date of Patent: Sep. 7, 1999

[54] FORWARDING MECHANISM FOR MULTI-DESTINATION PACKETS TO MINIMIZE PER PACKET SCHEDULING OVERHEAD IN A NETWORK FORWARDING ENGINE

[75] Inventor: Arnold N. Sodder, Newtonville, Mass.

[73] Assignee: 3Com Corporation, Santa Clara, Calif.

[21] Appl. No.: 08/847,038

[22] Filed: May 1, 1997

[51] Int. Cl.$^6$ ........................................... H04J 3/24
[52] U.S. Cl. .................... 370/397; 370/399; 370/409; 370/426; 370/432
[58] Field of Search .................... 370/351, 384, 370/397, 399, 409, 419, 423, 426, 465, 509, 432

[56] References Cited

U.S. PATENT DOCUMENTS

| | | | |
|---|---|---|---|
| 4,387,278 | 6/1983 | Hayes et al. | 370/426 |
| 5,301,192 | 4/1994 | Henrion | 370/94.1 |
| 5,309,439 | 5/1994 | Roos | 370/104.1 |
| 5,430,715 | 7/1995 | Corbalis et al. | 370/54 |
| 5,440,547 | 8/1995 | Easki et al. | 370/60 |
| 5,452,293 | 9/1995 | Wilkinson et al. | 370/54 |
| 5,467,347 | 11/1995 | Petersen | 370/60.1 |
| 5,467,349 | 11/1995 | Huey et al. | 370/397 |
| 5,485,455 | 1/1996 | Dobbins et al. | 370/60 |
| 5,491,694 | 2/1996 | Oliver et al. | 370/85.4 |
| 5,521,910 | 5/1996 | Matthews | 370/54 |
| 5,539,744 | 7/1996 | Chu et al. | 370/60 |
| 5,548,731 | 8/1996 | Chang et al. | 395/280 |
| 5,555,244 | 9/1996 | Gupta et al. | 370/60.1 |
| 5,561,669 | 10/1996 | Lenney et al. | 370/60.1 |
| 5,561,769 | 10/1996 | Kumar et al. | 395/200.05 |
| 5,574,934 | 11/1996 | Mirashrafi et al. | 395/800 |
| 5,583,858 | 12/1996 | Hanaoka | 370/392 |
| 5,583,865 | 12/1996 | Esaki et al. | 370/397 |
| 5,684,804 | 11/1997 | Baronetti et al. | 370/509 |

*Primary Examiner*—Douglas W. Olms
*Assistant Examiner*—Shick Hom
*Attorney, Agent, or Firm*—Weingarten, Schurgin, Gagnebin & Hayes LLP

[57] ABSTRACT

A technique for designating output interfaces through which a data unit is transmitted in point-to-multipoint transmission is disclosed. An indicating word having a flag field, a group indicator field and a bitmask field is employed. The number of bits in the bitmask is less than the total number of output interfaces. The bitmask field has a plurality of bits for indicating output interfaces and the group indicator field designates an offset value such that the bitmask field and group indicator field together indicate particular individual output interfaces. The flag field serves as notification that additional such words are to be received in association with a given point-to-multipoint data unit transmission.

15 Claims, 2 Drawing Sheets

FORWARDING MECHANISM FOR MULTI-DESTINATION PACKETS TO MINIMIZE PER PACKET SCHEDULING OVERHEAD IN A NETWORK FORWARDING ENGINE

BACKGROUND OF THE INVENTION

The present invention relates generally to telecommunications networks, and more particularly to point-to-multipoint transmission within telecommunications networks.

Data originating from a single source may be delivered by a network forwarding engine to a plurality of destinations in a telecommunications network. This operation is sometimes referred to as a "multicast" or "point-to-multipoint" transmission. The forwarding engine includes a plurality of I/O interfaces from which data is sent to such destinations. Due to cost constraints, the total number of I/O interfaces associated with any single network forwarding engine, at present, is usually less than 32.

In order to indicate which I/O interfaces will be utilized for point-to-multipoint transmission it is known to use a bitmask having a bit corresponding to each respective I/O interface. For example, a 32-bit bitmask would be employed to designate I/O interfaces for point-to-multipoint transmission in a network forwarding engine having up to 32 I/O interfaces. However, as associated costs decline, network forwarding engines having greater numbers of I/O interfaces will be desirable, and the bitmask required by this known technique will eventually become impracticably large. Hence, there is a need for a forwarding mechanism which scales efficiently as the number I/O interfaces in network forwarding engines increases.

BRIEF SUMMARY OF THE INVENTION

In accordance with the present invention a network forwarding engine with a plurality of output interfaces is disclosed which employs a bitmask and an offset associated with the bitmask to designate output interfaces through which a data unit is transmitted in a point-to-multipoint transmission. The number of bits in the bitmask is less than the total number of output interfaces, and each bit in the bitmask can represent any one of a plurality of output interfaces as specified by the offset.

The bitmask and offset are represented in a multicast specifying word having a flag field, a group indicator field and a bitmask field. The bitmask field has a plurality of bits for indicating output interfaces and the group indicator field designates an offset value, whereby the bitmask field and group indicator field operate together to indicate particular individual output interfaces.

The output interfaces are combined into groups of equal size. The bitmask field includes a number of bits equal to the size of each group. Each sequential bit in the bitmask field is then set to correspond to respective sequential output interfaces in a group, where the group is designated by the group indicator field. For example, if the group indicator field indicates group 1, then the first bit in the bitmask field corresponds to the first output interface of group 1. However, if the group indicator indicates group 3, then the first bit in the bitmask field corresponds to the first output interface in group 3. At least one of such words is then sent to indicate designated output interfaces by setting the bits in the mask field and sending one such word for each group containing a designated output interface. The flag field serves as notification that additional such words are to be received in association with a given point-to-multipoint data unit transmission.

The multicast specifying word is particularly efficient for large destination ranges in which relatively few destinations are specified. Known forwarding mechanisms employ brute force techniques wherein a designation indication (positive or negative) is provided for each and every output interface. In contrast, the multicast specifying word selectively designates output interfaces such that a single word is employed for each group in which at least one output interface is designated, with no wasted words associated with groups in which no output interface is designated.

The present technique can be used to build systems where the forwarding element is implemented as an Application Specific Integrated Circuit ("ASIC") and the solution can be defined for a very large range of maximum destinations by defining the bitmask length as a static quantity in a register. This allows for implementations which support 256 ports at present time and which can be expanded for use with a greater number of ports at a future time using the same ASIC.

BRIEF DESCRIPTION OF THE DRAWING

The invention will be more fully understood in view of the following Detailed Description of the Invention, and the Drawing, of which.

DETAILED DESCRIPTION OF THE INVENTION

Figure 1:
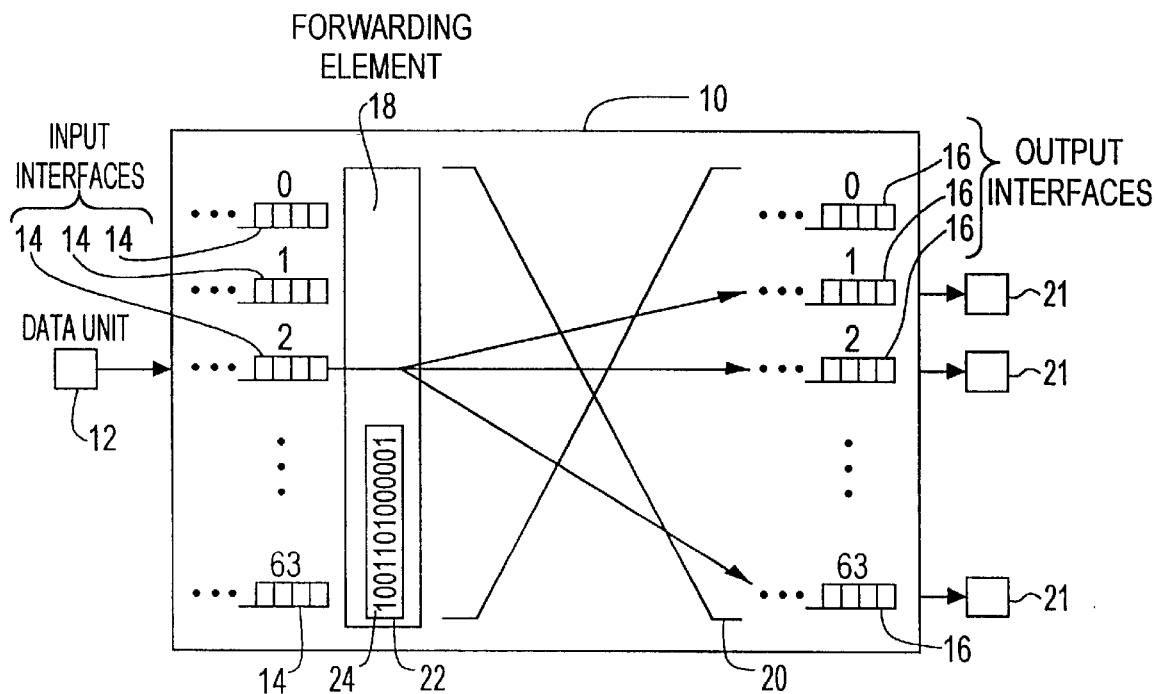
FIG. 1 illustrates a network forwarding engine.

FIG. 1 illustrates a network forwarding engine 10 for use in transmitting a protocol data unit 12 such as a frame, packet or ATM cell, from at least one source to at least one destination in a telecommunications network. The network forwarding engine includes a plurality of input interfaces 14, a plurality of output interfaces 16, a forwarding element 18 and a switch fabric 20. The protocol data unit 12 is received in at least one input interface and is then directed through the switch fabric 20 to at least one output interface 16 such that copies 21 of the data unit 12 are transmitted from the network forwarding engine 10.

In the case of point-to-multipoint transmission ("multicast"), the protocol data unit 12 is forwarded to a plurality of output interfaces for transmission from the network forwarding engine. The forwarding element 18 operates to facilitate such multicast operation by determining appropriate output interfaces for transmitting the multicast protocol data unit based upon addressing information associated with the protocol data unit. In particular, the forwarding element 18 includes a register 22 for storing a multicast specifying word 24 having a bitmask and an offset which designate individual output interfaces in groups of output interfaces 16 designated for transmission of the multicast protocol data unit. The switch fabric 20 is operative to interconnect each input interface with each output interface such that a protocol data unit received at any of the input interfaces can be transmitted from any of the output interfaces.

Figure 2:
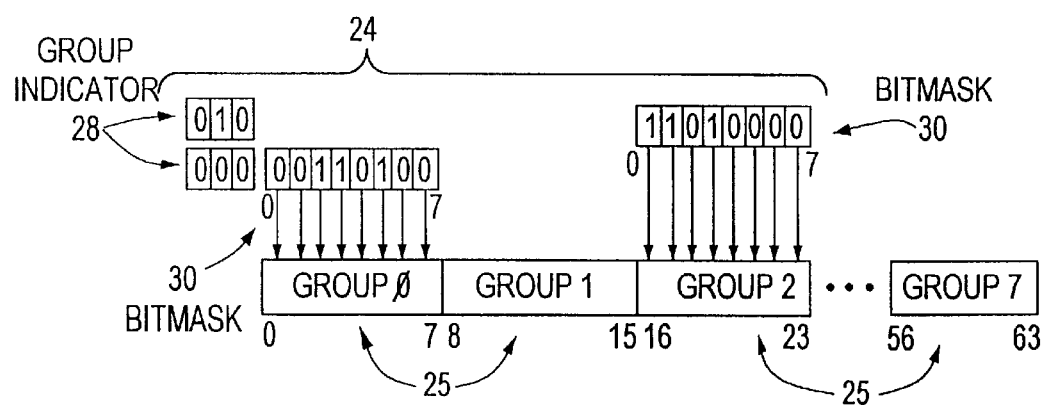
FIG. 2 illustrates the grouping of output interfaces.

Referring to FIGS. 1 and 2, the word 24 can be set to correspond to any group 25 including a predetermined number of output interfaces, where the bitmask indicates individual output interfaces within each group and the offset indicates a particular group. In the illustrated embodiment the network forwarding engine includes 64 output interfaces arranged in eight groups, assigned identification numbers 0–7 respectively, with eight output interfaces per group. The output interfaces in each group are represented in the multicast specifying word by a bitmask field 30 wherein each bit corresponds exclusively to one output interface; here an 8-bit bitmask. The group number is indicated, in binary, by an offset in a group indicator field 28. In particular, bits 0 through 7 of group 0 correspond to output interfaces 0 through 7 with offset "000," respectively, and bits 0 through 7 of group 2 correspond to output interfaces 8 through 15 with offset "010," respectively.

Figure 3:
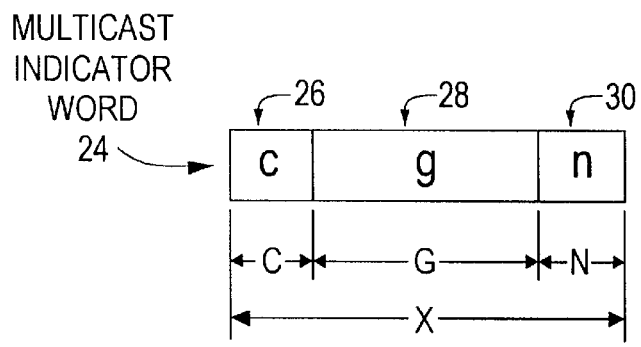
FIG. 3 illustrates a multicast specifying word.

Referring to FIG. 3, the multicast indicator word preferably includes three fields: a flag field 26, the group indicator field 28 and the bitmask field 30. The register 22 in FIG. 1 has a length X to accommodate a word, such as a 32 bit word as illustrated in FIG. 3, where N defines the number of bits within the register that can be used to designate groups of output interfaces. C is a single bit which indicates when a complete list of output interfaces has been conveyed to the forwarding element for a particular data unit. G is (31−N). For the above described example the multicast indicator word is 12-bits in length, with C=1, G=3 and N=8. However, various lengths for the word and each field therein could be employed, as will be apparent to those of ordinary skill in the art.

Figure 4:
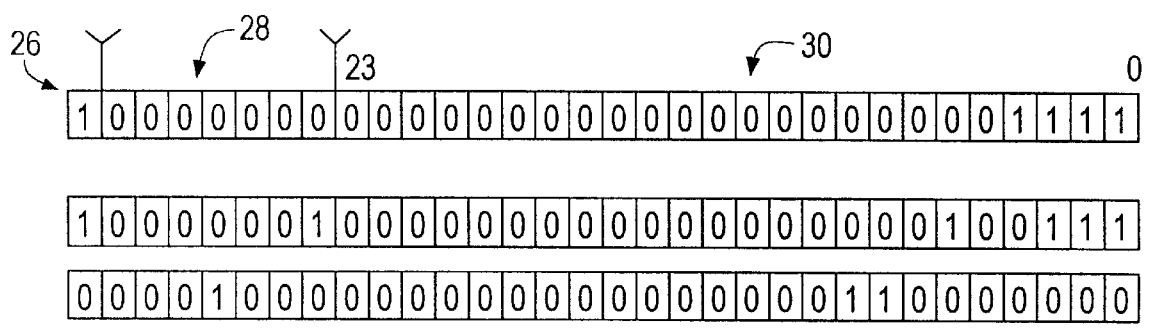
FIG. 4 illustrates use of multicast specifying words for multicast transmission.

Referring to FIGS. 3 and 4, one advantage of the multicast indicator word is efficient scaling. For example, given a destination range of 256 output interfaces, a 32 bit multicast indicator word, a mask field length N=24, and G=7, when a data unit is to be forwarded to ten of the destinations in the range, and the ten destinations are identified as output interfaces 0, 1, 2, 3, 24, 25, 26, 29, 199, 200, only three 32 bit write operations are required. In the first write operation c=1, g=0, and n=00000F (hex), where the respective values in the flag, group indicator and bitmask fields are "c," "g" and "n." In the second write operation c=1, g=1, and n=000027 (hex). In the third write operation c=0, g=8, n=000180 (hex). The forwarding element receives these words sequentially. From the first word the forwarding element determines that since g=0, the bits in N refer to output interfaces 0, 1, 2, and 3. Since c=1, the forwarding element anticipates another word. From the second word the forwarding element determines that since g=1, the list of destinations is those identified in n=000027 (hex) (0, 1, 2, 5), offset by 24* g=24, and resulting in transmission through output interfaces 24, 25, 26 and 29. Since c=1, the forwarding element anticipates another word. From the third word the forwarding element determines that since g=8, the list of destinations is those identified by n=000180 (hex) (7, 8) offset by 24* 8=192 resulting in transmission through output interfaces 199 and 200. Since c=0, the forwarding element determines that the list of destinations is now complete for this data unit. It should be noted that for G=7, i.e., $g_{max}$=127 (dec), and N=24, up to 24*128=3072 output interfaces can be accommodated.

A special case may be defined for more efficient indication of a multicast transmission to be made through every output interface in the forwarding engine, i.e., for an all-points-broadcast. For example, a single word wherein the flag C is set to "0" and each bit in the group indicator and bitmask fields is set to "1" may be used to indicate an all-points-broadcast. Hence, to provide a list of all 256 destinations in the above example, a single word would be required with c=0, g=7F (hex) and n=FFFFFF (hex).

Having described the preferred embodiments of the invention, other embodiments which incorporate the concepts of the invention will now become apparent to one of skill in the art. Therefore, the invention should not be viewed as limited to the disclosed embodiments but rather should viewed as limited only by the spirit and scope of the appended claims.

What is claimed is:

1. In a network forwarding engine having a plurality of input interfaces, a plurality of output interfaces, and a forwarding element, a method for designating output interfaces through which a data unit received in one of said input interfaces is to be transmitted comprising:

identifying at least one output interface through which the data unit is to be transmitted;

generating a mask for a portion of the plurality of output interfaces in which at least one output interface has been identified in the identifying step;

associating an offset value with the mask, wherein the offset value indicates the portion of the plurality of output interfaces in which at least one output interface has been identified; and writing a predetermined value to at least one indicator in the mask corresponding to the at least one output interface identified in the identifying step, the predetermined value indicating a respective output interface through which the data unit is to be transmitted.

2. The method of claim 1 including the further step of generating a plurality of masks, each one of the plurality of masks corresponding to a respective one of a plurality of portions of the output interfaces, and providing a flag value corresponding to each one of the plurality of masks, the flag value being indicative of whether each output interface identified in the identifying step has been designated in one of said plurality of masks.

3. The method of claim 2 including the further step of setting a bit in one of said plurality of masks for each designated output interface.

4. The method of claim 3 including the further step of representing the offset value with a binary value.

5. The method of claim 4 including the further step of grouping each one of said plurality of masks with a corresponding flag value, and an associated offset value into a single digital word.

6. The method of claim 1 including the further step of grouping the output interfaces into a plurality of portions containing an equal number of output interfaces, and generating a plurality of masks, wherein each of the plurality of masks includes a number of bits equal to the number of output interfaces in each of the plurality of portions of the output interfaces.

7. The method of claim 1 including the further step of employing a special signal in the mask to designate transmission of the data unit to each and every output interface.

8. The method of claim 7, wherein said special signal to designate transmission of the data unit to each and every output interface is generated at least in part by writing predetermined logic values into the flag value, and each bit in the mask and offset value.

9. A network forwarding engine for forwarding a data unit to a plurality of destinations, comprising:

a plurality of input interfaces operative to receive inputted data units;

a plurality of output interfaces operative to transmit designated data units; and a forwarding element operative to identify output interfaces through which data units received in the input interfaces are to be transmitted, and to designate such identified output interfaces in at least one mask having a plurality of respective identifiers corresponding to individual output interfaces within a portion of the plurality of output interfaces, wherein the a portion of the plurality of output interfaces is associated with an offset value, the forwarding element being further operative to generate the at least one mask in the event that the portion of the plurality of output interfaces includes at least one designated output interface.

10. The network forwarding engine of claim 9 further including a corresponding flag value generated by the forwarding element for each mask, the flag value being indicative of whether each identified output interface has been designated in the at least one mask.

11. The network forwarding engine of claim 9 wherein the mask includes a plurality of bits, each one of said plurality of bits corresponding to a respective one of said portion of the plurality of output interfaces, with those bits corresponding to output interfaces identified for transmission of the data unit being set to a predetermined value.

12. The network forwarding engine of claim 11 wherein the offset value is a binary value.

13. The network forwarding engine of claim 11 wherein a digital word is formed with each corresponding flag value, offset value and mask.

14. The network forwarding engine of claim 13 wherein a predetermined value of said digital word designates transmission of the data unit to each and every output interface.

15. The network forwarding engine of claim 14 wherein said predetermined value of said digital word includes a flag value set to logic "0" and each bit in the mask and offset set to logic "1".

* * * * *